US012799677B2

(12) United States Patent
Lu

(10) Patent No.: US 12,799,677 B2
(45) Date of Patent: Nov. 17, 2026

(54) COMPOSITIONS AND METHODS FOR INCREASED WET AND DRY STRENGTH

(71) Applicant: KEMIRA OYJ, Helsinki (FI)

(72) Inventor: Chen Lu, Marietta, GA (US)

(73) Assignee: KEMIRA OYJ, Helsinki (FI)

( * ) Notice: Subject to any disclaimer, the term of this patent is extended or adjusted under 35 U.S.C. 154(b) by 715 days.

(21) Appl. No.: 17/910,401

(22) PCT Filed: Mar. 17, 2021

(86) PCT No.: PCT/US2021/022809
§ 371 (c)(1),
(2) Date: Sep. 9, 2022

(87) PCT Pub. No.: WO2021/188705
PCT Pub. Date: Sep. 23, 2021

(65) Prior Publication Data

US 2023/0140638 A1 May 4, 2023

Related U.S. Application Data

(60) Provisional application No. 62/991,318, filed on Mar. 18, 2020.

(30) Foreign Application Priority Data

May 27, 2020 (FI) ..................................... 20205543

(51) Int. Cl.

| | |
|---|---|
| ***D21H 17/45*** | (2006.01) |
| ***C08F 220/56*** | (2006.01) |
| ***D21H 11/14*** | (2006.01) |
| ***D21H 21/20*** | (2006.01) |
| ***D21H 23/04*** | (2006.01) |
| ***D21H 27/00*** | (2006.01) |

(52) U.S. Cl.
CPC ......... *D21H 17/455* (2013.01); *C08F 220/56* (2013.01); *D21H 11/14* (2013.01); *D21H 21/20* (2013.01); *D21H 23/04* (2013.01); *D21H 27/002* (2013.01); *C08F 2800/20* (2013.01); *C08F 2810/50* (2013.01)

(58) Field of Classification Search
CPC ...... D21H 17/455; D21H 11/14; D21H 21/40; D21H 23/04; D21H 27/002; C08F 220/56; C08F 2800/20; C08F 2810/50
See application file for complete search history.

(56) References Cited

U.S. PATENT DOCUMENTS

| | | | | |
|---|---|---|---|---|
| 2016/0201269 | A1 | 7/2016 | Wright | |
| 2016/0222590 | A1* | 8/2016 | Zhu ........................ | D21H 17/37 |
| 2019/0309480 | A1* | 10/2019 | Luo ........................ | D21H 19/10 |
| 2019/0359739 | A1 | 11/2019 | Wright | |
| 2020/0079950 | A1 | 3/2020 | Karppi et al. | |

OTHER PUBLICATIONS

Yuan, Zhao Yang, et al. "Synthesis and application of glyoxalted polyacrylamide paper strengthening agent." Advanced Materials Research 236 (2011): 1385-1390.

* cited by examiner

*Primary Examiner* — Abbas Rashid
*Assistant Examiner* — Stephen M Russell
(74) *Attorney, Agent, or Firm* — Robin L. Teskin; Baker, Donelson, Bearman, Caldwell & Berkowitz PC

(57) ABSTRACT

The present disclosure generally relates to glyoxalated polyacrylamide (GPAM) products, compositions comprising GPAM products, and methods of use thereof, particularly in the paper industry. Moreover, the present disclosure generally pertains to cationic GPAM products, compositions comprising, and use thereof in papermaking applications and in products such as paper-based products, wherein the cationic GPAM products may provide increased wet and/or dry strength to the paper-based product and wherein such GPAMs optionally can be stored and transported to a papermaking site without the addition of large volumes of aqueous carriers.

18 Claims, No Drawings

COMPOSITIONS AND METHODS FOR INCREASED WET AND DRY STRENGTH

RELATED APPLICATIONS

This application is a U.S. National Phase application of Int'l Appl. No. PCT/US2021/022809, filed Mar. 17, 2021, which claims priority to U.S. Provisional Appl. No. 62/991,318, filed Mar. 18, 2020 and Finnish Appl. No. 20205543, filed May 27, 2020, each of which are incorporated herein by reference in their entireties.

FIELD OF THE ART

The present disclosure generally relates to glyoxalated polyacrylamide (GPAM) products, compositions and articles comprising and methods of use thereof, particularly GPAM products that are useful in the paper industry, and more particularly cationic GPAM products and use thereof in papermaking applications and in products such as paper-based products.

BACKGROUND

Glyoxalated polyacrylamide (GPAM) products are widely used in the paper industry, often to increase paper wet and dry strength. For example, glyoxalated polyacrylamide can increase the initial wet strength of many household tissues, a useful property as household tissues often come into contact with water during their use. Applying glyoxalated polyacrylamide to paper products can also increase the compression strength and the dimensional stability of many board-grade paper products.

GPAM is typically prepared through a reaction between glyoxal and a polyacrylamide base polymer, such as a cationic polyacrylamide backbone. In some instances, the reaction between glyoxal and cationic polyacrylamide is carried out in slightly alkaline aqueous solution and stabilized under acidic conditions. In practice, the polyacrylamide component of the GPAM products often contains relatively low amounts of cationic monomer, typically below about 5 mole percent thereof, thereby limiting the cationic charge contribution to the GPAM product.

Moreover, GPAMs produced by conventional methods generally cannot be dried into a solid particulate form without inducing significant and rapid crosslinking of the GPAM, which limits the utility of the resulting GPAM product. As such, GPAM is typically stored and transported in a bulk aqueous fluid carrier. The volumes of the GPAM product transported in this manner can be significant, which often requires large volume containers or tanker vessels for transport. Shipping such large volumes of product significantly increases costs for those transporting and using the GPAM products.

As a result of the properties of current GPAM products and the logistical considerations regarding their transport, a need remains for GPAM products that comprise properties that promote lower shipping costs and/or lower shipping amounts of GPAM products while still maintaining the desired properties of the GPAM product.

BRIEF SUMMARY

The present disclosure generally relates to a cationic glyoxalated polyacrylamide ("GPAM") suitable for use as a dry and/or wet strengthening agent, wherein said cationic GPAM comprises: a. a base polymer comprising at least 15% by weight of cationic monomer, optionally wherein the cationic monomer comprises DADMAC and/or acryloyloxyethyltrimethyl ammonium chloride ("Q9"); b. the base polymer comprises a weight average molecular weight of at least 25,000 Da, optionally at least 30,000 Da; c. the cationic GPAM comprises a glyoxal:base polymer weight ratio of at least about 17:83, optionally from about 20:80, further optionally from at least about 23:77, further optionally from at least about 25:75; and d. the GPAM optionally comprises a solids percentage of from about 2% to about 11%, optionally from greater than about 4% to about 11%, further optionally from about greater than 4% to about 8%, further optionally from about greater than 4% to about 7%; wherein optionally said cationic GPAM can be stored and transported without the addition of large volumes of aqueous carriers or using reduced volumes of aqueous carriers compared to conventional GPAMs used in papermaking.

Moreover, the present disclosure generally pertains to a cationic glyoxalated polyacrylamide ("GPAM") suitable for use as a dry and/or wet strengthening agent, wherein said cationic GPAM comprises: a. a base polymer of at least 15% by weight of cationic monomer, optionally wherein the cationic monomer comprises DADMAC and/or acryloyloxyethyltrimethyl ammonium chloride ("Q9"); b. the base polymer comprises a weight average molecular weight of at least 25,000 Da, optionally at least 30,000 Da; c. the cationic GPAM comprises a glyoxal:base polymer weight ratio of at least about 17:83, optionally, from at least about 20:80, further optionally from at least about 23:77, further optionally, from at least about 25:75; and d. the GPAM optionally comprises a solids percentage of from about 2% to about 11%, optionally from greater than about 4% to about 11%, further optionally from about greater than 4% to about 8%, further optionally from about greater than 4% to about 7%; further optionally wherein the GPAM content of the cationic GPAM is from about 2% to about 11%, optionally from about 3% to about 10%, further optionally from about 4% to about 8%, further optionally from about 5% to about 7%; wherein optionally said cationic GPAM can be stored and transported without the addition of large volumes of aqueous carriers or using reduced volumes of aqueous carriers compared to conventional GPAMs used in papermaking.

In some embodiments, the GPAM content of the cationic GPAM may be from about 2% to about 11%, optionally from about 3% to about 10%, further optionally from about 4% to about 8%, further optionally from about 5% to about 7%. In some embodiments, the base polymer may comprise a weight average molecular weight of about 25 kDa or more, 30 kDa or more, 40 kDa or more, 50 kDa or more, 75 kDa or more, 100 kDa or more, 125 kDa or more, 150 kDa or more, 175 kDa or more, 200 kDa or more, 225 kDa or more, 250 kDa or more, 275 kDa or more, 300 kDa or more, 325 kDa or more, 350 kDa or more, 375 kDa or more, 400 kDa or more, or 500 kDa or more. In some embodiments, the base polymer may comprise a charge of at least 15% by weight, at least 20% by weight, at least 25% by weight, at least 30% by weight, at least 35% by weight, at least 40% by weight, at least 50% by weight, or at least 60% by weight. In some embodiments, the cationic GPAM may comprise a solids percentage of about 2% or more, 2.5% or more, 3.0% or more, 3.5% or more, 4.0% or more, 4.5% or more, 5.0% or more, 5.5% or more, 6.0% or more, 6.5% or more, 7.0% or more, 7.5% or more, 8.0% or more, 8.5% or more, 9.0% or more, 9.5% or more, 10.0% or more, 10.5% or more, 11.0% or more, or 11.5% or more. In some embodiments, the cationic GPAM may comprise a glyoxal:base polymer weight ratio of at least about 17:83, at least about 18:82, at least about 19:81, at least about 20:80, at least about 21:79, at least about 22:78, at least about 23:77, at least about 24:76, at least about 25:75, at least about 26:74, at least about 27:73, at least about 28:72, at least about 29:71, or at least about 30:70. In some embodiments, the cationic GPAM may comprise a base polymer comprising a cationic monomer:acrylamide weight ratio of from about 15:85 to about 60:40, optionally from about 20:80 to about 55:45, further optionally from about 25:75 to about 50:50. In some embodiments, the back bone may comprise one or more cationic monomers. In some embodiments, the cationic GPAM may comprise a viscosity of about 30 cPs or more, about 31 cPs or more, about 32 cPs or more, about 33 cPs or more, about 34 cPs or more, or about 35 cPs or more, for example as measured by Brookfield viscometer. In some embodiments, the backbone polymer may comprise a copolymer of acrylamide or methacrylamide and one or more cationic monomers. In some embodiments, the back bone polymer may comprise an acrylamide-based polymer. In some embodiments, the aqueous carrier may comprise water. In some embodiments, the cationic GPAM may comprise a solids percentage of from about greater than 4% to about 8%, optionally from about greater than about 4% to about 7%, further optionally from about 5% to about 7%, e.g., from about 5% to about 6%.

In some embodiments, said one or more cationic monomers may be selected from the group consisting of acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6 (methacryloyloxyethyltrimethylammonium chloride), Q6o (dimethylaminoethyl methacrylate sulfate, diallyldimethylammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. In some embodiments, said one or more cationic monomers may comprise DADMAC. In some embodiments, said one or more cationic monomers may comprise acryloyloxyethyltrimethyl ammonium chloride ("Q9"). In some embodiments, said one or more cationic monomers may comprise DADMAC and/or acryloyloxyethyltrimethyl ammonium chloride ("Q9"). In some embodiments, said one or more cationic monomers may be selected from the group consisting of methacryloyloxyethyltrimethyl ammonium chloride, acryloyloxyethyltrimethyl ammonium chloride (aka Q9), 3-(methacrylamido) propyltrimethyl ammonium chloride, 3-(acryloylamido) propyltrimethyl ammonium chloride, diallyldimethyl ammonium chloride (DADMAC), dimethylaminoethyl acrylate, dimethylaminoethyl methacrylate, and dimethylaminopropylacrylamide, dimethylaminopropylmethacrylamide.

In some embodiments, the back bone polymer may comprise one or more primary amide-containing monomers. In some embodiments, the back bone polymer may comprise one or more monomers selected from the group consisting of acrylamide, methacrylamide, ethylacrylamide, crotonamide, N-methyl acrylamide, N-butyl acrylamide, N-ethyl methacrylamide, and any combination thereof. In some embodiments, the back bone polymer may comprise one or more acrylamide monomers.

Additionally, the present disclosure generally relates to a paper product comprising one or more cationic GPAMs as discussed herein. In some embodiments, said paper product may comprise at least one paper layer or web containing the cationic GPAM. In some embodiments, said paper product may comprise one or more of paper sheeting, paperboard, tissue paper, and wall board. In some embodiments, said paper product may comprise one or more of Kraft paper, sulfite paper, semichemical paper, and the like, including paper produced using bleached pulp, unbleached pulp, or combinations thereof. In some embodiments, said paper product may comprise a fiber-based product. In some embodiments, said paper product may comprise one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper. In some embodiments, said paper product may comprise cellulose paperboard webs which optionally comprise predominantly cellulose fibers. In some embodiments, said paper product may comprise from about 0.02% to about 10% cationic GPAM by dry weight of cellulose fibers, optionally in the range of about 0.05 wt % to 5 wt % of the dry paper weight. In some embodiments, said paper product may comprise an STFI value improvement of 6% or more, 7% or more, 8% or more, 9% or more, 10% or more, 12.5% or more, 15.0% or more, 17.5% or more, 20.0% or more, 22.5% or more, 25.0% or more at either 4.5 lbs/ton, 5.0 lbs/ton, 9.0 lbs/ton or 10 lbs/ton testing as compared to a blank sample used for the STFI test of the paper product. In some embodiments, said paper product may comprise a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at either 4.5 lbs/ton, 5.0 lbs/ton, 9.0 lbs/ton or 10 lbs/ton testing as compared to a blank sample used for the burst strength test.

Moreover, the present disclosure generally relates to a method of papermaking, wherein said method comprises adding one or more cationic GPAMs as discussed herein during the papermaking method in an amount effective to increase the wet and/or dry strength of paper products produced by said method.

Furthermore, the present disclosure generally relates to a method of making a handsheet, said method comprising: a. providing a pulp stock; b. diluting the pulp stock; c. adding one or more salts to a desired level of conductivity; d. adjusting the pH to a desired value; e. adding one or more cationic GPAMs as discussed herein; f. adding the treated pulp to a dynamic sheet former; g. pressing the sheets resulting from f.; h. drying the sheets; and i. conditioning the sheets.

Additionally, the present disclosure generally pertains to a method of manufacturing one or more paper products, wherein said method comprises: a. providing a composition comprising predominantly cellulose fibers; b. adding a predetermined quantity of one or more cationic GPAMs as discussed herein; and c. forming the desired paper product.

Furthermore, the present disclosure generally relates to a method of manufacturing one or more paper products, optionally one or more adsorbent paper products, wherein said method comprises: a. providing a composition comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of one or more cationic GPAMs as discussed herein; and (c) forming a paper product by drying on one or more drying means to a desired moisture content level.

Moreover, the present disclosure generally relates to a method for strengthening paper, comprising contacting pulp fibers with a strengthening resin comprising at least cationic GPAM as discussed herein, and at least partially curing the cationic GPAM in the mixture of pulp fibers and cationic GPAM to produce a paper product of enhanced strength.

In some embodiments, the cationic GPAM may be added at the wet end of a paper-making facility to the cellulose fiber suspensions. In some embodiments, the cationic GPAM may be added at from about 0.02% by dry weight to about 10% by dry weight of the cellulose fibers, optionally in the range of about 0.05 wt % to 5 wt % of the dry paper weight. In some embodiments, the cationic GPAM may be added before, during and/or after the paper is formed. In some embodiments, the paper product may comprise an STFI value improvement of 6% or more, 7% or more, 8% or more, 9% or more, 10% or more, 12.5% or more, 15.0% or more, 17.5% or more, 20.0% or more, 22.5% or more, 25.0% or more at either 4.5 lbs/ton, 5.0 lbs/ton, 9.0 lbs/ton or 10 lbs/ton testing as compared to a blank sample used for the STFI test of the paper product. In some embodiments, the paper product may comprise a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at either 4.5 lbs/ton, 5.0 lbs/ton, 9.0 lbs/ton or 10 lbs/ton testing as compared to a blank sample used for the burst strength test. In some embodiments, the paper product may comprise one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper. In some embodiments, the paper product may comprise cellulose paperboard webs which optionally comprise predominantly cellulose fibers. In some embodiments, cationic GPAM compositions may effect efficient drainage, e.g., drainage of OCC pulp, such as demonstrating an improvement in drainage time, e.g., time to collect a given amount of filtrate from OCC pulp, of 25.0% or more, 30.0% or more, 35.0% or more, 40.0% or more, 45.0% or more, 50.0% or more, 55.0% or more as compared to the drainage without the use of a cationic GPAM composition. In some embodiments, the cationic GPAM may improve the drainage rate of a treatment sample resulting in increased paper production rate as compared to the drainage without the use of a cationic GPAM composition. Furthermore, cationic GPAM compositions may effect a decrease in the total amount of solids present in a treated sample, e.g., a decrease in the total solids present in a filtrate collected from OCC pulp treated with a cationic GPAM, e.g., a decrease in the solid content of white water from tray or silo post sheet forming, such as an improvement (decrease in solids content) of 15% or more, 17.5% or more, 20.0% or more, 22.5% or more, 25.0% or more, 27.5% or more, 30.0% or more, or 32.5% or more as compared to the total amount of solids present in a sample without the use of a cationic GPAM composition. In some embodiments, the cationic GPAM may improve drying energy savings.

Furthermore, the present disclosure generally relates to a cationic glyoxalated polyacrylamide ("GPAM") suitable for use as a dry and/or wet strengthening agent, wherein said cationic GPAM comprises a base polymer of at least 15% by weight of cationic monomer, wherein the cationic monomer comprises DADMAC and/or acryloyloxyethyltrimethyl ammonium chloride ("Q9"), further wherein the base polymer comprises a weight average molecular weight of at least 30,000 Da, wherein the cationic GPAM comprises a glyoxal: base polymer weight ratio of at least about 17:83, optionally from about 20:80, wherein the GPAM comprises a solids percentage of from about 2% to about 11%, optionally from more than 4% to about 11%, further optionally from about greater than 4% to about 8%, further optionally from about greater than 4% to about 7%, and further wherein the base polymer comprises one or more acrylamide monomers and further optionally wherein said cationic GPAM can be stored and transported without the addition of large volumes of aqueous carriers, optionally wherein the aqueous carrier comprises water, further optionally wherein said cationic GPAM can be stored and transported without the addition of large volumes of aqueous carriers.

Moreover, the present disclosure generally relates to a cationic glyoxalated polyacrylamide ("GPAM") suitable for use as a dry and/or wet strengthening agent, wherein said cationic GPAM comprises a base polymer of at least 15% by weight of cationic monomer, wherein the cationic monomer comprises DADMAC and/or acryloyloxyethyltrimethyl ammonium chloride ("Q9"), further wherein the base polymer comprises a weight average molecular weight of at least 30,000 Da, wherein the cationic GPAM comprises a glyoxal: base polymer weight ratio of at least about 17:83, optionally from about 20:80, wherein the GPAM comprises a solids percentage of from about 2% to about 11%, optionally from more than 4% to about 11%, further optionally from about greater than 4% to about 8%, further optionally from about greater than 4% to about 7%; and further wherein the GPAM content of the cationic GPAM is from about 2% to about 11%, optionally from about 3% to about 10%, further optionally from about 4% to about 8%, further optionally from about 5% to about 7%, further optionally wherein said cationic GPAM can be stored and transported without the addition of large volumes of aqueous carriers.

Inn some embodiments the GPAM will comprise one or more of the following:

i. the backbone polymer comprises or consists of acrylamide and/or methacrylamide monomers and cationic monomers selected from DADMAC and/or acryloyloxyethyltrimethyl ammonium chloride ("Q9");
ii. the backbone polymer comprises or consists of acrylamide and/or methacrylamide monomers and cationic monomers selected from DADMAC and/or acryloyloxyethyltrimethyl ammonium chloride ("Q9") and optionally comprises a molecular weight ranging from at least about 50 kDa to 1500 kDa, further optionally at least about 100 kDa to 1000 kDa, or still further optionally at least about 140 kDa to 1000 kDa;
iii. the backbone polymer comprises or consists of acrylamide and/or methacrylamide monomers and cationic monomers selected from DADMAC and/or acryloyloxyethyltrimethyl ammonium chloride ("Q9") and optionally comprises a molecular weight ranging from at least about 50 kDa to 1500 kDa, or at least about 100 kDa to 1000 kDa, or at least about 140 kDa to 1000 kDa and the basepolymer charge of the basepolymer optionally ranges from 15-60%, 20-50%, 20-40%, or optionally comprises 20%, 30% or 40%; and the cationic GPAM optionally comprises a glyoxal:base polymer weight ratio of at least about 17:83, or optionally from about 20:80, further optionally at least about 23:77 to about 29:71, still further optionally at least about 25:75, 26:74, 27:73, 28:72 or 29:71;
iv. an aqueous carrier comprising water;
v. the cationic GPAM comprises a solids percentage of from greater than about 4% to about 8%, optionally from about 5% to about 7%, optionally about 7%, 5.5%, or 5.0%; and/or
vi. a combination of any two or more of (i)-(v).

DETAILED DESCRIPTION

Definitions

As used herein the singular forms "a", "an", and "the" include plural referents unless the context clearly dictates otherwise. All technical and scientific terms used herein have the same meaning as commonly understood to one of ordinary skill in the art to which this invention belongs unless clearly indicated otherwise.

As used herein, the term "monomer" generally refers to nonionic monomers, anionic monomers, cationic monomers, zwitterionic monomers, betaine monomers, and amphoteric ion pair monomers.

As used herein, the terms "polymer," "polymers," "polymeric," and similar terms are used in their ordinary sense as understood by one skilled in the art, and thus may be used herein to refer to or describe a large molecule (or group of such molecules) that comprise recurring units. Polymers may be formed in various ways, including by polymerizing monomers and/or by chemically modifying one or more recurring units of a precursor polymer. Unless otherwise specified, a polymer may comprise a "homopolymer" that may comprise substantially identical recurring units that may be formed by various methods e.g., by polymerizing a particular monomer. Unless otherwise specified, a polymer may also comprise a "copolymer" that may comprise two or more different recurring units that may be formed by, e.g., copolymerizing, two or more different monomers, and/or by chemically modifying one or more recurring units of a precursor polymer. Unless otherwise specified, a polymer or copolymer may also comprise a "terpolymer" that may comprise polymers that may comprise three or more different recurring units. The term "polymer" as used herein is intended to include both the acid form of the polymer as well as its various salts. Polymers may be amphoteric in nature, i.e., containing both anionic and cationic substituents, although not necessarily in the same proportions.

As used herein the term "nonionic monomer" generally refers to a monomer that possesses a neutral charge.

As used herein, the term "anionic monomers" may refer to either anionic monomers that are substantially anionic in whole or (in equilibrium) in part, at a pH in the range of about 4.0 to about 9.0. The "anionic monomers" may be neutral at low pH (from a pH of about 2 to about 6), or to anionic monomers that are anionic at low pH.

As used herein, the term "cationic monomer" generally refers to a monomer that possesses a positive charge. Examples of cationic monomers may comprise but are not limited to those comprising acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6 (methacryloyloxyethyltrimethylammonium chloride), Q6o (dimethylaminoethyl methacrylate sulfate, and/or diallyldimethylammonium chloride ("DADMAC"). Said cationic monomers may also comprise but are not limited to comprising dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride. Alkyl groups may generally comprise but are not limited to those comprising $C_{1-8}$ alkyl groups. In some embodiments, cationic monomers may comprise quaternary ammonium or acid salts of vinyl amide, vinyl carboxylic acid, methacrylate and their derivatives. Cationic monomers can be combined, for example, to form a terpolymer of dimethylaminoethylmethacrylate methyl chloride quaternary salt, and diallyldimethyl ammonium chloride and acrylamide.

As used herein, the terms "papermaking process" and "papermaking application" generally refer to any process in which any form of paper and/or paperboard product may be produced. For example, such processes include making paper products from pulp, such as methods comprising forming an aqueous cellulosic papermaking furnish, draining the furnish to form a sheet, and drying the sheet. The steps of forming the papermaking furnish, draining and drying may be carried out in any conventional manner generally known in the art.

As used herein, the terms "polyacrylamide" or "PAM" generally refer to polymers and co-polymers comprising acrylamide moieties, and the terms encompass any polymers or copolymers comprising acrylamide moieties, e.g., one or more acrylamide (co)polymers. In some instances, PAMs may comprise anionic PAMs (APAMs), cationic PAMs (CPAMs), and/or sulfonated PAMs (SPAMs). In some embodiments, a polyacrylamide may be a cationic polyacrylamide (cPAM).

As used herein, the term "glyoxalated polyacrylamide" ("GPAM") generally refers to a polymer obtained by reacting glyoxal and a polyacrylamide base polymer. Methods for producing glyoxalated polyacrylamides are known in the art. (See e.g., U.S. Pat. No. 3,556,932 which first disclosed the synthesis of a GPAM product prepared by reacting glyoxal with a cationic polyacrylamide). In some instances, the polyacrylamide backbone of the GPAM can incorporate a small amount of a cationic monomer, rendering the polymer self-retaining on fibers. In general, GPAM comprises a reactive polymer that can covalently bind with cellulose upon dehydration.

The present invention provides cationic GPAMs having a specific composition and properties which are well suited for use in papermaking processes, i.e., for use as additives for increasing paper wet and/or dry strength; and which possess enhanced storage and transport properties, e.g., unlike conventional GPAMs used in papermaking processes the subject cationic GPAMs can be stored and transported without the need for the addition of large volumes of aqueous carriers, which is undesirable as well as costly as this generally requires large volume containers or tanker vessels for transport. In some instances, the aqueous carrier may comprise water. In some instances, the volume of aqueous carrier used during transport of the cationic GPAMs discussed herein may be less than that used to transport a conventional GPAM. For example, in some instances conventional GPAMs may comprise a solids percentage of 4% or less, whereas in some embodiments cationic GPAMs may comprise a solids percentage of greater than 4%, i.e., from greater than 4% to about 11%, e.g., from about greater than 4% to about 8%, from about greater than 4% to about 7%, from about 5% to about 7%, or from about 5% to about 6%.

As used herein, the term "cationic GPAM" generally refers to a GPAM composition comprising a base polymer comprising at least 15% by weight of cationic monomer, optionally wherein the cationic monomer comprises DADMAC, wherein the base polymer comprises a weight average molecular weight of at least 25,000 Da, optionally at least 30,000 Da, further wherein the GPAM comprises a glyoxal:base polymer weight ratio of at least about 17:83, optionally from at least about 20:80, e.g., from at least about 23:77, e.g., from at least about 25:75, and further optionally wherein the GPAM comprises a solids percentage of from about 2% to about 11%, e.g., from about greater than 4% to about 8%, e.g., from about greater than 4% to about 7%, e.g., from about 5% to about 7%, e.g., from about 5% to about 6%, further optionally wherein said cationic GPAM can be stored and transported without the addition of large volumes of aqueous carriers. In some instances, the GPAM content of the cationic GPAM may range from about 2% to about 11%, optionally from about 3% to about 10%, further optionally from about 4% to about 8%, further optionally from about 5% to about 7%. In some embodiments, the cationic GPAM may comprise a base polymer having a weight average molecular weight of about 25 kDa or more, 30 kDa or more, 40 kDa or more, 50 kDa or more, 75 kDa or more, 100 kDa or more, 125 kDa or more, 150 kDa or more, 175 kDa or more, 200 kDa or more, 225 kDa or more, 250 kDa or more, 275 kDa or more, 300 kDa or more, 325 kDa or more, 350 kDa or more, 375 kDa or more, 400 kDa or more, or 500 kDa or more. In some embodiments, the base polymer may comprise a charge of at least 15% by weight, at least 20% by weight, at least 25% by weight, at least 30% by weight, at least 35% by weight, at least 40% by weight, at least 50% by weight, or at least 60% by weight. In some embodiments, a cationic GPAM may comprise a solids percentage of about 2% or more, 2.5% or more, 3.0% or more, 3.5% or more, 4.0% or more, 4.5% or more, 5.0% or more, 5.5% or more, 6.0% or more, 6.5% or more, 7.0% or more, 7.5% or more, 8.0% or more, 8.5% or more, 9.0% or more, 9.5% or more, 10.0% or more, 10.5% or more, 11.0% or more, or 11.5% or more. In some embodiments, the cationic GPAM may comprise a glyoxal:base polymer weight ratio of at least about 17:83, at least about 18:82, at least about 19:81 at least about 20:80, at least about 21:79, at least about 22:78, at least about 23:77, at least about 24:76, at least about 25:75, at least about 26:74, at least about 27:73, at least about 28:72, at least about 29:71, or at least about 30:70. In some embodiments, the cationic GPAM may comprise a base polymer comprising a cationic monomer:acrylamide weight ratio of from about 15:85 to about 60:40, optionally from about 20:80 to about 55:45, further optionally from about 25:75 to about 50:50, optionally wherein the cationic monomer comprises DADMAC. In some embodiments, the cationic GPAM may comprise a viscosity of about 30 cPs or more, about 31 cPs or more, about 32 cPs or more, about 33 cPs or more, about 34 cPs or more, or about 35 cPs or more, for example as measured by a Brookfield viscometer. In some embodiments, the cationic monomer of the polymer back bone of the cationic GPAM may comprise any one or more of the cationic monomers described herein. In some instances, the cationic monomer may comprise DADMAC and/or may comprise acryloyloxyethyltrimethyl ammonium chloride (aka Q9). In some embodiments, the back bone polymer may comprise an acrylamide-based polymer, wherein the acrylamide monomer is replaced by other primary amide-containing monomers such as methacrylamide, ethylacrylamide, crotonamide, N-methyl acrylamide, N-butyl acrylamide, or N-ethyl methacrylamide, or any combination thereof. In some embodiments, back bone polymer comprises acrylamide monomers. The cationic GPAMs described herein may be used in any papermaking process, as further described herein. Moreover, the cationic GPAMs described herein possess properties that should lower shipping costs and manufacturing costs, thereby providing benefits to manufacturers and end-users of the cationic GPAMs.

As used herein, the term "white water" generally refers to the process water and/or produced water that may be removed from the pulp furnish during formation of a paper product, such as a sheet, e.g., a handsheet.

Compositions and Methods

GPAM products and compositions containing comprise known usage in the paper industry, typically as wet and/or dry strengthening agents. However, conventional GPAMs generally need to be stored and transported in a bulk aqueous fluid carrier in large volumes, which often requires large volume containers or tanker vessels for transport. Shipping such large volumes of product significantly increases costs for those transporting and using the GPAM products. As such, there is a need for improved GPAM products and compositions, such as those comprising cationic GPAMs, which, based on their composition are useful in papermaking processes and which possess storage properties that should result in reduced shipping costs.

Toward that end, the present disclosure generally relates to improved GPAM products and compositions comprising one or more cationic GPAMs, wherein said cationic GPAMs comprise a base polymer, optionally an acrylamide-based base polymer, further optionally a cationic polyacrylamide base polymer, comprising at least 15% by weight of cationic monomer, optionally wherein the cationic monomer comprises DADMAC, further wherein the base polymer comprises a weight average molecular weight of at least 25,000 Da, optionally at least 30,000 Da, and wherein the GPAM comprises a glyoxal:base polymer weight ratio of at least about 17:83, optionally from about 20:80, e.g., from about 23:77, e.g., from about 25:75, and further optionally wherein the GPAM comprises a solids percentage of from about 2% to about 11%, e.g., from about greater than 4% to about 8%, e.g., from about greater than 4% to about 7%, e.g., from about 5% to about 7%, e.g., from about 5% to about 6%, which compositions are useful in papermaking processes and which possess improved storage properties that should result in reduced shipping costs, further optionally wherein said cationic GPAM can be stored and transported without the addition of large volumes of aqueous carriers or using reduced volumes of aqueous carriers compared to conventional GPAMs used in papermaking For example, the volume of aqueous carrier used during transport of the cationic GPAMs discussed herein may be less than that used to transport a conventional GPAM. For example, in some instances conventional GPAMs may comprise a solids percentage of 4% or less, whereas in some embodiments cationic GPAMs may comprise a solids percentage of greater than 4%, i.e., from greater than 4% to about 11%, e.g., from about greater than 4% to about 8%, e.g., from about greater than 4% to about 7%, from about 5% to about 7%, or from about 5% to about 6%.

Moreover, the present disclosure generally relates to improved GPAM products and compositions comprising a cationic glyoxalated polyacrylamide ("GPAM") which are suitable for use as a dry and/or wet strengthening agent, wherein said cationic GPAM comprises a base polymer of at least 15% by weight of cationic monomer, optionally wherein the cationic monomer comprises DADMAC, further wherein the base polymer comprises a weight average molecular weight of at least 25,000 Da, optionally at least 30,000 Da, wherein the cationic GPAM comprises a glyoxal: base polymer weight ratio of at least about 17:83, optionally, from about 20:80, further optionally, from about 23:77, further optionally, from about 25:75, and optionally wherein the GPAM comprises a solids percentage of from about 2% to about 11%, e.g., from about greater than 4% to about 8%, e.g., from about greater than 4% to about 7%, e.g., e.g., from about 5% to about 7%, e.g., from about 5% to about 6%, further optionally wherein the GPAM content of the cationic GPAM is from about 2% to about 11%, optionally from about 3% to about 10%, further optionally from about 4% to about 8%, further optionally from about 5% to about 7%, further optionally wherein said cationic GPAM can be stored and transported without the addition of large volumes of aqueous carriers or using reduced volumes of aqueous carriers compared to conventional GPAMs used in papermaking. In some embodiments, the composition may comprise a cationic GPAM comprising a GPAM content of from about 2% to about 11%, optionally from about 3% to about 10%, further optionally from about 4% to about 8%, further optionally from about 5% to about 7%.

In some embodiments, the cationic GPAM may comprise a base polymer having a weight average molecular weight of about 25 kDa or more, 30 kDa or more, 40 kDa or more, 50 kDa or more, 75 kDa or more, 100 kDa or more, 125 kDa or more, 150 kDa or more, 175 kDa or more, 200 kDa or more, 225 kDa or more, 250 kDa or more, 275 kDa or more, 300 kDa or more, 325 kDa or more, 350 kDa or more, 375 kDa or more, 400 kDa or more, 500 kDa, 1000 kDa, 1500 kDa or more.

In some embodiments, the base polymer may comprise a charge of at least 15% by weight, at least 20% by weight, at least 25% by weight, at least 30% by weight, at least 35% by weight, at least 40% by weight, at least 50% by weight, or at least 60% by weight, optionally from about 20-40% by weight. In some embodiments, a cationic GPAM may comprise a solids percentage of about 2% or more, 2.5% or more, 3.0% or more, 3.5% or more, 4.0% or more, 4.5% or more, 5.0% or more, 5.5% or more, 6.0% or more, 6.5% or more, 7.0% or more, 7.5% or more, 8.0% or more, 8.5% or more, 9.0% or more, 9.5% or more, 10.0% or more, 10.5% or more, 11.0% or more, or 11.5% or more. In some embodiments, a cationic GPAM may comprise a solids percentage of from about greater than 4% to about 8%, optionally from about greater than 4% to about 7%, further optionally from about 5% to about 7%, e.g., from about 5% to about 6%.

In some embodiments, the cationic GPAM may comprise a glyoxal:base polymer weight ratio of at least about 17:83, at least about 18:82, at least about 19:81 at least about 20:80, at least about 21:79, at least about 22:78, at least about 23:77, at least about 24:76, at least about 25:75, at least about 26:74, at least about 27:73, at least about 28:72, at least about 29:71, or at least about 30:70. In some embodiments, the cationic GPAM may comprise a base polymer comprising a cationic monomer:acrylamide weight ratio of from about 15:85 to about 60:40, optionally from about 20:80 to about 55:45, further optionally from about 25:75 to about 50:50, optionally wherein the cationic monomer comprises DADMAC and/or acryloyloxyethyltrimethyl ammonium chloride (aka Q9).

In some embodiments, the cationic GPAM may comprise a viscosity of about 30 cPs or more, about 31 cPs or more, about 32 cPs or more, about 33 cPs or more, about 34 cPs or more, or about 35 cPs or more, for example as measured by a Brookfield viscometer.

In some embodiments, the cationic monomer of the polymer back bone of the cationic GPAM may comprise any one or more of the cationic monomers described herein. In some instances, cationic monomer may comprise DADMAC and/or may comprise acryloyloxyethyltrimethyl ammonium chloride (aka Q9). The properties of such cationic GPAM compositions, such as the cationic charge, the solids percentage, and/or the GPAM content, as compared to conventional GPAMs, demonstrate desirable and effective end-use performance, and the properties of the cationic GPAMs disclosed and exemplified herein should translate into huge reductions in product volumes needing to be transported and handled, such as, for example, where railway tanker car or tanker truck shipments and the like are involved, and thus significant savings in costs and handling can be obtained using the subject cationic GPAMs.

In some embodiments, the cationic polyacrylamide of the cationic GPAM may comprise a cationic copolymer of acrylamide or methacrylamide. In some embodiments, the PAM may comprise a cationic copolymer of acrylamide or methacrylamide that may be produced by copolymerizing acrylamide or methacrylamide with one or more cationic monomer(s). In some embodiments, said one or more cationic monomers may comprise any one or more of the cationic monomers discussed herein. In some embodiments, said one or more cationic monomers may include, but are not limited to including, methacryloyloxyethyltrimethyl ammonium chloride, acryloyloxyethyltrimethyl ammonium chloride (aka Q9), 3-(methacrylamido) propyltrimethyl ammonium chloride, 3-(acryloylamido) propyltrimethyl ammonium chloride, diallyldimethyl ammonium chloride (DADMAC), dimethylaminoethyl acrylate, dimethylaminoethyl methacrylate, dimethylaminopropylacrylamide, dimethylaminopropylmethacrylamide, and similar monomers. In some embodiments, the cationic GPAM may comprise a cationic monomer comprising any one or more of 2-vinylpyridine, 2-vinyl-N-methylpyridinium chloride, (p-vinylphenyl)trimethyl ammonium chloride, diallyldimethylammonium chloride, 2-(dimethylamino)ethyl acrylate, trimethyl p-vinylbenzyl)ammonium chloride, p-dimethylaminoethylstyrene, dimethylaminopropyl acrylamide, 2-methylacroyloxyethyltrimethyl ammonium methylsulfate, or 3-acrylamido-3-methylbutyl trimethyl ammonium chloride, or any combination thereof. In some embodiments, the cPAM may comprise a copolymer of acrylamide or methacrylamide and DADMAC. In some embodiments, the cPAM may comprise a copolymer of acrylamide or methacrylamide and Q9 (acryloyloxyethyltrimethyl ammonium chloride). In some embodiments, a cPAM may comprise one or more cationic monomers, such as those discussed herein, a net charge that is cationic, and an acrylamide or methacrylamide backbone. In some embodiments, a cPAM may comprise an acrylamide or methacrylamide based polymer that is treated after the polymerization to render it cationic, for example, by using Hofmann or Mannich reactions. In some embodiments, a cPAM may comprise a cationic copolymer of acrylamide or methacrylamide that may be prepared by conventional radical-initiation polymerization methods.

In some embodiments, the back bone polymer may comprise an acrylamide-based polymer, wherein the acrylamide monomer is replaced by other primary amide-containing monomers such as methacrylamide, ethylacrylamide, crotonamide, N-methyl acrylamide, N-butyl acrylamide, or N-ethyl methacrylamide, or any combination thereof. In some embodiments, the back bone polymer may comprise acrylamide monomers. In some embodiments, the one or more cationic monomers may be selected from the group consisting of acryloyloxy ethyl trimethyl ammonium chloride ("AETAC"), methacryloyloxyethyltrimethylammonium chloride, methacrylamidopropyltrimethylammonium chloride ("MAPTAC"), acrylamidopropyltrimethylammonium chloride, methacryloyloxyethyldimethylammonium sulfate, dimethylaminoethyl acrylate, dimethylaminopropylmethacrylamide, Q6 (methacryloyloxyethyltrimethylammonium chloride), Q6o (dimethylaminoethyl methacrylate sulfate), diallyldimethylammonium chloride ("DADMAC"); dialkylaminoalkyl acrylates and methacrylates and their quaternary or acid salts, including, but not limited to, dimethylaminoethyl acrylate methyl chloride quaternary salt ("DMAEA.MCQ"), dimethylaminoethyl acrylate methyl sulfate quaternary salt ("DMAEM.MCQ"), dimethyaminoethyl acrylate benzyl chloride quaternary salt ("DMAEA.BCQ"), dimethylaminoethyl acrylate sulfuric acid salt, dimethylaminoethyl acrylate hydrochloric acid salt, diethylaminoethyl acrylate, methyl chloride quaternary salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dimethylaminoethyl methacryloyl hydrochloric acid salt, dialkylaminoalkylacrylamides or methacrylamides and their quaternary or acid salts such as acrylamidopropyltrimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate and diallyldialkylammonium halides such as diallyldiethylammonium chloride and diallyldimethyl ammonium chloride.

Based on the foregoing the present disclosure further generally relates to a method of papermaking, wherein said method comprises adding one or more cationic GPAM products and compositions as afore-described, which, based on their composition are useful in papermaking processes, and which moreover possess storage properties that should result in reduced shipping costs; which method generally comprises the addition of one or more of such cationic GPAMs during a papermaking method in an amount effective to increase the wet and/or dry strength of the paper. In some embodiments, the cationic GPAM may comprise any one or more of the cationic GPAMs disclosed herein. In some embodiments, the cationic GPAM may comprise a base polymer, optionally acrylamide-based, further optionally a cationic polyacrylamide, of at least 15% by weight of cationic monomer, optionally wherein the cationic monomer comprises DADMAC, further wherein the base polymer comprises a weight average molecular weight of at least 25,000 Da, optionally at least 30,000 Da, wherein the GPAM comprises a glyoxal:base polymer weight ratio of at least about 17:83, optionally from about 20:80, e.g., from about 23:77, e.g., from about 25:75, and further optionally wherein the GPAM comprises a solids percentage of from about 2% to about 11%, e.g., from about greater than 4% to about 8%, e.g., from about greater than 4% to about 7%, e.g., for about 5% to about 7%, e.g., from about 5% to about 6%.

In some embodiments, the cationic GPAMs described herein provide thermosetting resins that are particularly suitable for use as additives in papermaking methods, i.e., wherein the addition of said cationic GPAMs results in papers with desirable dry and temporary wet strength, and/or increases the papermaking de-watering rate.

Moreover, the present disclosure further relates to paper products comprising one or more improved GPAM products and compositions as disclosed herein, such as those comprising cationic GPAMs as afore-described. In some embodiments, the paper product may comprise at least one paper layer or web containing the cationic GPAM, for example, paper sheeting, paperboard, tissue paper, and wall board. The cationic GPAM is not limited to use in any particular type of paper or papermaking method and should find application in Kraft paper, sulfite paper, semichemical paper, and the like, including paper produced using bleached pulp, unbleached pulp, or combinations thereof.

When using a cationic GPAM composition as disclosed herein during a papermaking method, the cationic GPAM composition can be added at any time before, during and/or after paper formation. In some instances, the cationic GPAM composition may be added at the wet end of a paper-making facility to the cellulose fiber suspensions, generally at a point when wet strength resins are conventionally added. In some embodiments, the cationic GPAM composition can be added to a previously prepared paper by padding, spraying, immersing, and/or printing and the like. Moreover, in some embodiments, the cationic GPAM composition may be added to paper pulp over a wide range of pH values, such as from about 4 to about 9.

In some instances, the amount of cationic GPAM composition added during a papermaking method may range from about 0.02% by dry weight to about 10% by dry weight of the cellulose fibers, e.g., in the range of about 0.05 wt % to 5 wt % of the dry paper weight.

Still further, the present disclosure generally relates to a paper product, e.g., a handsheet, comprising one or more cationic GPAMs, e.g., cationic GPAMs as afore-described, which, based on their composition are useful in papermaking processes and which optionally possess storage properties that should result in reduced shipping costs. In some embodiments, the paper product may comprise fiber-based products, e.g., handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, and/or other paperboard products such as cartons and bag paper. In some embodiments, the paper product may comprise cellulose paperboard webs which comprise: (a) predominantly cellulose fibers and (b) one or more cationic GPAMs.

In some embodiments, the paper product may comprise a handsheet. In some embodiments, a handsheet comprising one or more cationic GPAMs may comprise an STFI value improvement of 6% or more, 7% or more, 8% or more, 9% or more, 10% or more, 12.5% or more, 15.0% or more, 17.5% or more, 20.0% or more, 22.5% or more, 25.0% or more at either 4.5 lbs/ton, 5.0 lbs/ton, 9.0 lbs/ton or 10 lbs/ton testing as compared to the blank sample used for the STFI test.

In some embodiments, a handsheet comprising one or more cationic GPAMs may comprise an burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at either 4.5 lbs/ton, 5.0 lbs/ton, 9.0 lbs/ton or 10 lbs/ton testing as compared to the blank sample used for the burst strength test.

In some embodiments, cationic GPAM compositions may effect efficient drainage, e.g., drainage of OCC pulp, such as demonstrating an improvement in drainage time, e.g., time to collect a given amount of filtrate from OCC pulp, of 25.0% or more, 30.0% or more, 35.0% or more, 40.0% or more, 45.0% or more, 50.0% or more, 55.0% or more as compared to the drainage without the use of a cationic GPAM composition. In some embodiments, the cationic GPAM improves the drainage rate of a treatment sample resulting in increased paper production rate as compared to the drainage without the use of a cationic GPAM composition. Furthermore, cationic GPAM compositions may effect a decrease in the total amount of solids present in a treated sample, e.g., a decrease in the total solids present in a filtrate collected from OCC pulp treated with a cationic GPAM, e.g., a decrease in the solid content of white water from tray or silo post sheet forming, such as an improvement (decrease in solids content) of 15% or more, 17.5% or more, 20.0% or more, 22.5% or more, 25.0% or more, 27.5% or more, 30.0% or more, or 32.5% or more as compared to the total amount of solids present in a sample without the use of a cationic GPAM composition. In some embodiments, the cationic GPAM may improve drying energy savings.

Moreover, the present disclosure generally relates to a method of making a handsheet, said method comprising: a. providing a pulp stock; b. diluting the pulp stock; c. adding one or more salts to a desired level of conductivity; d. adjusting the pH to a desired value; e. adding one or more cationic GPAMs; f. adding the treated pulp to a dynamic sheet former; g. pressing the sheets resulting from f.; h. drying the sheets; and i. conditioning the sheets.

Furthermore, the present disclosure generally relates to a method of manufacturing one or more paper products, wherein said method comprises: a. providing a composition comprising predominantly cellulose fibers; b. adding a predetermined quantity of one or more cationic GPAMs; and c. forming the desired paper product.

Moreover, the present disclosure generally encompass a method of manufacturing one or more paper products, e.g., one or more adsorbent paper products, wherein said method comprises: a. providing a composition comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of cationic GPAMs as discussed herein; and (c) forming a paper product by drying on one or more drying means to a desired moisture content level.

Additionally, the present disclosure generally relates to a method for strengthening paper, comprising (i) contacting pulp fibers with a strengthening resin comprising at least one cationic GPAM, e.g., at least one of the improved cationic GPAM products and compositions disclosed herein, which GPAMs possess specific attributes which render them well suited for use in papermaking processes, and (ii) at least partially curing the cationic GPAM in the mixture of pulp fibers and cationic GPAM to produce a paper product of enhanced strength.

Moreover, the present disclosure generally relates to a cationic glyoxalated polyacrylamide ("GPAM") suitable for use as a dry and/or wet strengthening agent, wherein said cationic GPAM comprises a base polymer of at least 15% by weight of cationic monomer, wherein the cationic monomer comprises DADMAC and/or Q9 (acryloyloxyethyltrimethyl ammonium chloride), further wherein the base polymer comprises a weight average molecular weight of at least 30,000 Da, wherein the cationic GPAM comprises a glyoxal: base polymer weight ratio of at least about 17:83, optionally from about 20:80, wherein the GPAM comprises a solids percentage of from about 2% to about 11%, e.g., from about greater than 4% to about 8%, e.g., from about greater than 4% to about 7%, e.g., from about 5% to about 7%, e.g., from about 5% to about 6%, and further wherein the base polymer comprises one or more acrylamide monomers. Furthermore, the present disclosure generally relates to a cationic glyoxalated polyacrylamide ("GPAM") suitable for use as a dry and/or wet strengthening agent, wherein said cationic GPAM comprises a base polymer of at least 15% by weight of cationic monomer, wherein the cationic monomer comprises DADMAC and/or Q9 (acryloyloxyethyltrimethyl ammonium chloride), further wherein the base polymer comprises a weight average molecular weight of at least 30,000 Da, wherein the cationic GPAM comprises a glyoxal: base polymer weight ratio of at least about 17:83, optionally from about 20:80, wherein the GPAM comprises a solids percentage of from about 2% to about 11%, e.g., from about greater than 4% to about 8%, e.g., from about greater than 4% to about 7%, e.g., from about 5% to about 7%, e.g., from about 5% to about 6%, and further wherein the GPAM content of the cationic GPAM is from about 2% to about 11%, optionally from about 3% to about 10%, further optionally from about 4% to about 8%, further optionally from about 5% to about 7%.

The compositions and methods illustratively disclosed herein suitably may be practiced in the absence of any element which is not specifically disclosed herein and/or any element specifically disclosed herein.

EXAMPLES

Example 1: Sample and Handsheet Preparation

The GPAM samples and the handsheets used in the following examples were prepared as follows. All GPAM samples were prepared by reacting glyoxal with a cationic polyacrylamide base polymer. Table 1 presents the compositions of the cationic polyacrylamide base polymers that were used for GPAM sample preparation.

TABLE 1

BASE POLYMER COMPOSITIONS

| Examples | Basepolymer MW (kilo Dalton) | Basepolymer charge % (wt %) |
|---|---|---|
| Basepolymer 1* | 8 | 40% |
| Basepolymer 2 | 15 | 10% |
| Basepolymer 3 | 148 | 40% |
| Basepolymer 4 | 246 | 40% |
| Basepolymer 5 | 1054 | 40% |
| Basepolymer 6 | 246 | 40% |
| Basepolymer 7 | 330 | 30% |
| Basepolymer 8 | 350 | 20% |
| Basepolymer 9 | 216 | 60% |

*Each of Basepolymers 1-9 are comprised of acrylamide and DADMAC monomers. Cationic copolymers comprising acrylamide and DADMAC monomers were used in the examples herein because such copolymers are widely used as a "model" cationic polymer. Accordingly, it is reasonably expected that the results obtained using these copolymers will be obtained with other cationic polymers such as cationic copolymers comprising other cationic monomers which are disclosed herein.

Compositions of the GPAM samples prepared by reacting glyoxal with the base polymers of Table 1 are described in Table 2. Each of the GPAM samples had a final viscosity from 30 cps to 35 cps as measured by a Brookfield viscometer equipped with an LV-1 spindle.

TABLE 2

GPAM SAMPLE COMPOSITIONS

| Sample Name | Base polymer | Glyoxal/base polymer weight ratio | Solids % |
|---|---|---|---|
| Comparative sample 1 | Base polymer 1 | 29:71 | 11% |
| Comparative sample 2 | Base polymer 2 | 23:77 | 7% |
| Sample 1 | Base polymer 3 | 29:71 | 5.5% |
| Sample 2 | Base polymer 4 | 29:71 | 5% |
| Sample 3 | Base polymer 5 | 29:71 | 3% |
| Sample 4 | Base polymer 6 | 26:74 | 5% |
| Sample 5 | Base polymer 6 | 23:74 | 5% |
| Sample 6 | Base polymer 6 | 17:83 | 5% |
| Sample 7 | Base polymer 7 | 29:71 | 3.5% |
| Sample 8 | Base polymer 8 | 29:71 | 2.5% |
| Sample 9 | Base polymer 9 | 29:71 | 7% |

Handsheets were prepared as follows. OCC pulp thick stock was obtained from a recycled liner board paper mill. First, the thick stock was dilated to 0.5% consistency using tap water. NaCl was then added to the diluted pulp to match mill white water conductivity. 1M HCl solution was added to the pulp to adjust pH to 6.4. Following pH adjustment, GPAM products were introduced to the diluted pulp under overhead agitation. Next, the treated pulp was added to a dynamic sheet former (DSF) (TECHPAP France, type—FDA) to produce 110 gsm sheet. After the sheets were produced, the formed sheets were pressed with blotting paper at 15 psi using a pneumatic roll press and then dried on a rotary dryer at 110° C. Then, dry paper sheets were oven cured at 105° C. for 5 minutes using a forced air conventional oven, and then conditioned in the standard TAPPI control room overnight. After the overnight conditioning, paper strips were cut along the cross direction, and the STFI testing was performed as generally described by TAPPI standard method T-826. Burst strength testing was performed as generally described by TAPPI standard method T-403.

Example 2: GPAM Concentration

In the present example, the maximum GPAM concentration and critical base polymer concentration of base polymer 6, base polymer 7, and base polymer 8 (see Table 1), was evaluated. The maximum GPAM concentration relates to the concentration of polyacrylamide and glyoxal mixture above which the glyoxalation reaction proceeds rapidly and the mixture viscosity reaches 30 cps at pH between 8.5 to 9.0 in less than 30 minutes. The critical base polymer concentration relates to the concentration above which the viscosity increases for the reaction mixture resulting from the forward progress of the adduct formation, and below which the viscosity decreases for the reaction mixtures resulting from the forward progress of adduct formation. The maximum GPAM concentration and critical base polymer concentration of base polymer 6, base polymer 7, and base polymer 8 are presented in Table 3.

TABLE 3

| MAXIMUM GPAM CONCENTRATION AND CRITICAL BASE POLYMER CONCENTRATION | | | | |
|---|---|---|---|---|
| Basepolymer | Basepolymer charge (wt %) | Glyoxal/ basepolymer weight ratio | Maximum GPAM concen-tration | Critical base polymer concen-tration |
| Base polymer 6 | 40% | 29:71 | 5.5% | 2.1% |
| Base polymer 7 | 30% | 29:71 | 4.5% | 1.8% |
| Base polymer 8 | 20% | 29:71 | 4.0% | 1.8% |

As presented in Table 3, the maximum GPAM concentration generally scaled with the base polymer charge density. For example, base polymer 6 and base polymer 8 have weight average molecular weights of about 300 kDa, and the 40% charged base polymer (base polymer 6) comprised a maximum GPAM concentration of 5.5% as compared to the 20% charged base polymer (base polymer 8) which comprised a maximum GPAM concentration of 4.0%.

Example 3: Handsheet Strength Tests

Handsheets were prepared using various different GPAM samples as described by Example 1. Following preparation, the handsheets were subjected to strength tests which included STFI strength testing and burst strength testing. The results of the strength tests are presented in Table 4 and Table 5. The composition of the samples used are described in Table 2 of Example 1.

TABLE 4

| STFI STRENGTH TEST RESULTS | | | | |
|---|---|---|---|---|
| Sample | 5 lb/ton STFI | Improvement | 10 lb/ton STFI | Improvement |
| Blank | 8.55 | NA | 8.55 | NA |
| Comparative sample 1 | 8.96 | 4.8% | 9.29 | 8.7% |
| Comparative Sample 2 | 9.03 | 5.6% | 9.33 | 9.1% |
| Sample 1 | 9.37 | 9.6% | 9.8 | 14.6% |
| Sample 2 | 9.27 | 8.4% | 10.07 | 17.8% |
| Sample 3 | 9.46 | 10.6% | 10.08 | 17.9% |

TABLE 5

| BURST STRENGTH TEST RESULTS | | | | |
|---|---|---|---|---|
| Sample | 5 lb/ton Burst | Improvement | 10 lb/ton Burst | Improvement |
| Blank | 35.16 | NA | 35.16 | NA |
| Sample 1 | 43.09 | 22.6% | 48.42 | 37.7% |
| Sample 2 | 43.14 | 22.7% | 48.37 | 37.6% |
| Sample 3 | 42.26 | 20.2% | 48.44 | 37.8% |
| Comparative Sample 2 | 40.13 | 14.1% | 42.47 | 20.8% |
| Comparative Sample 1 | 40.77 | 16.0% | 43.99 | 25.1% |

Comparative sample 1 and comparative sample 2 each were prepared using low weight average molecular weight base polymers (see Table 2 and Example 1). Sample 1, Sample 2, and Sample 3 were each prepared using base polymers with weight average molecular weights of over 100 kDa (see Table 2 and Example 1). As presented in Table 4 and Table 5, each of Sample 1, Sample 2, and Sample 3 demonstrated higher STFI and burst results as compared to Comparative sample 1 and comparative sample 2. Additionally, Sample 2, which comprised a GPAM content of 5%, provided comparable strength as compared to Sample 3, which comprised a GPAM content of 3%. It is noted that higher GPAM content is generally preferred as higher GPAM content can result in lower shipping and handling costs.

Example 4: Retention/Drainage Tests

In the present example, various different GPAM samples were subjected to retention/drainage tests. The various different GPAM samples were prepared in accordance with Example 1. The retention/drainage tests were performed using a Dynamic Drainage Analyzer 5 (DDA 5) (PulpEye). The OCC pulp used for the test was obtained from a container board mill without any wet end chemical addition. In a typical experiment, 1000 mL of OCC pulp was added to the DDA 5, and the overhead stirrer was started at 1100 rpm. Then, one of the GPAM products was added to the DDA 5 at 5 lb/ton. 10 seconds after the GPAM addition, a high weight average molecular weight flocculant (10 mole % cationic, SV=5) was added to the DDA 5. After another 10 seconds, the overhead stir speed was adjusted to 700 rpm. After a final 10 seconds of agitation, the overhead stirrer was stopped, and the OCC pulp was drained under 200 mBar vacuum. The time to collect 800 ml of filtrate was recorded as the drainage time. The total suspended solids (TSS) of the filtrate was also measured using a HACH turbidity meter.

Regarding the results presented in Table 6, a lower drainage time is indicative of a faster drainage rate during the tests that were performed, and a lower TSS is indicative of a higher retention efficiency during the tests that were performed. The results of the retention/drainage tests that were obtained are presented in Table 6. The composition of the samples used in the present example are described in Table 2 of Example 1.

TABLE 6

| RETENTION/DRAINAGE TEST RESULTS | | | | |
|---|---|---|---|---|
| Sample | Drainage time (sec) | Drainage time improvement | TSS (mg/L) | TSS improvement |
| None | 50 | 0.0% | 297 | 0.0% |
| Comparative Sample 1 | 47.7 | 4.6% | 263 | 11.4% |
| Sample 2 | 27.5 | 45.0% | 219 | 26.3% |
| Sample 3 | 23.9 | 52.2% | 208 | 30.0% |

As presented in Table 6, comparative example 1 reduced the drainage time by about 5%. By comparison, sample 2 and sample 3 reduced the drainage time by 45% and 52%, respectively. Additionally, Comparative example 1 decreased the total suspended solid content (TSS) by 11% whereas Sample 2 and Sample 3 decreased the TSS by 26% and 30%, respectively. As such, Sample 2 and Sample 3 provided improved drainage rate and improved retention efficiency as compared with Comparative example 1.

Example 5: Handsheet Strength Tests

Handsheets were prepared using various different GPAM samples as described by Example 1. Following preparation, the handsheets were subjected to strength tests which included STFI strength testing and burst strength testing. The results of the strength tests are presented in Table 7, Table 8, and Table 9. The composition of the samples used are described in Table 2 of Example 1.

TABLE 7

STFI STRENGTH TEST RESULTS

| Sample | 4.5 lb/ton STFI | Improvement | 9 lb/ton STFI | Improvement |
|---|---|---|---|---|
| Blank | 8.71 | NA | 8.71 | NA |
| Sample 2 | 9.93 | 14.0% | 10.65 | 22.3% |
| Sample 4 | 9.65 | 10.8% | 10.35 | 18.8% |
| Sample 5 | 9.52 | 9.3% | 10.02 | 15.0% |
| Sample 6 | 8.96 | 7.2% | 9.29 | 11.0% |

TABLE 8

STFI STRENGTH TEST RESULTS

| Sample | Base polymer charge % | 4.5 lb/ton STFI | Improvement | 9 lb/ton STFI | Improvement |
|---|---|---|---|---|---|
| Blank | NA | 9.10 | NA | 9.10 | NA |
| Sample 9 | 60% | 9.93 | 9.1% | 10.36 | 12.7% |
| Sample 2 | 40% | 10.53 | 15.7% | 11.00 | 20.9% |
| Sample 7 | 30% | 10.38 | 14.1% | 11.10 | 22.0% |
| Sample 8 | 20% | 10.48 | 15.2% | 10.84 | 19.1% |

TABLE 9

BURST STRENGTH TEST RESULTS

| Sample | Base polymer charge % | 4.5 lb/ton Burst | Improvement | 9 lb/ton Burst | Improvement |
|---|---|---|---|---|---|
| Blank | NA | 37.82 | NA | 37.82 | NA |
| Sample 9 | 60% | 45.09 | 19.2% | 49.94 | 32% |
| Sample 2 | 40% | 47.03 | 24.4% | 52.27 | 38.2% |
| Sample 7 | 30% | 45.82 | 21.2% | 50.97 | 34.8% |
| Sample 8 | 20% | 46.12 | 21.9% | 50.60 | 33.8% |

Referring now to Table 7, this table presents a comparison of the strength properties of handsheets prepared with various different GPAM samples, which samples were prepared using a base polymer comprising a weight average molecule weight of 246 kDa (see Table 2 and Table 1). The various different GPAM samples of Table 7 varied in glyoxal/base polymer ratio (see Table 2). As shown in Table 7, a higher glyoxal/base polymer ratio generally resulted in higher STFI values. For example, at 4.5 lb/ton GPAM dosage, a ratio of 17:83 resulted in an STFI improved of 7.2%, whereas a ratio of 29:71 resulted in an STFI improvement to 14.0%. Additionally, at 9.0 lb/ton GPAM dosage, a ratio of 17:83 resulted in an STFI improvement of 11.0%, whereas a ratio of 29:71 resulted in an STFI improvement of 22.3%.

Table 8 and Table 9 present a comparison of the STFI strength properties and burst strength properties, respectively, of various different GPAM samples. The weight average molecular weight of the base polymer was from about 200 kDa to about 350 kDa for the GPAM samples tested. Furthermore, as presented in Table 8 and Table 9, the base polymer charge percentage varied from about 20% to about 60%.

Referring now to Table 8, Sample 2, Sample 7, Sample 8, and Sample 9 all demonstrated an improvement in STFI as compared to the blank sample. For example, Sample 2, demonstrated improvements of 15.7% and 20.9% for the 4.5 lb/ton and 9 lb/ton STFI strength tests, respectively; Sample 7 demonstrated improvements of 14.1% and 22.0% for the 4.5 lb/ton and 9 lb/ton STFI strength tests, respectively, and Sample 8 demonstrated 15.2% and 19.1% improvements for the 4.5 lb/ton and 9 lb/ton STFI tests, respectively.

Referring now to Table 9, Sample 2, Sample 7, Sample 8, and Sample 9 all demonstrated an improvement in burst strength value as compared to the blank sample. For example, Sample 2 demonstrated improvements of 24.4% and 38.2% for the 4.5 lb/ton and 9 lb/ton burst strength, respectively; Sample 7 demonstrated improvements of 21.2% and 34.8% for the 4.5 lb/ton and 9 lb/ton burst strength, respectively; and Sample 8 demonstrated improvements of 21.9% and 33.8% for the 4.5 lb/ton and 9 lb/ton burst strength, respectively.

In the preceding procedures, various steps have been described. It will, however, be evident that various modifications and changes may be made thereto, and additional procedures may be implemented, without departing from the broader scope of the exemplary procedures as set forth in the claims that follow.

The invention claimed is:

1. A cationic glyoxalated polyacrylamide ("GPAM") suitable for use as a dry and/or wet strengthening agent, wherein said cationic GPAM comprises:

(i) a base polymer comprising (1) cationic monomers and (2) acrylamide or methacrylamide monomers, wherein the amount of said cationic monomers ranges from 30% to 40% by weight of the base polymer, and wherein the cationic monomers comprise DADMAC and/or acryloyloxyethyltrimethyl ammonium chloride ("Q9");

(ii) the base polymer comprises a weight average molecular weight ranging from about 148 kDa to about 350 kDa;

(iii) the cationic GPAM comprises a glyoxal:base polymer weight ratio of at least 23:77 to 29:71;

(iv) the maximum GPAM concentration (concentration of polyacrylamide and glyoxal mixture above which the glyoxalation reaction proceeds and the mixture viscosity reaches 30 cps at pH between 8.5 to 9.0 in less than 30 minutes) ranges from at least 4.5 to 5.5%; and (v) the GPAM comprises a solids percentage of from about 3.5% to about 7%; and wherein said cationic GPAM can be stored and transported without the addition of large volumes of aqueous carriers.

2. A cationic GPAM according to claim 1, wherein the cationic monomer:acrylamide or methacrylamide weight ratio of the base polymer is about 40:60% by weight.

3. The cationic GPAM of claim 1, wherein:

the solids content of the cationic GPAM is about 4% to about 7%.

4. The cationic GPAM of claim 1, wherein:

said cationic monomers comprise DADMAC.

5. The cationic GPAM of claim 1, wherein:

the back bone polymer comprises one or more acrylamide monomers.

6. A paper product comprising one or more cationic GPAMs according to claim 1.

7. The paper product of claim 6, wherein said paper product:

i. comprises at least one paper layer or web containing the cationic GPAM;

ii. comprises one or more of paper sheeting, paperboard, tissue paper, and wall board;

iii. comprises one or more of Kraft paper, sulfite paper, semichemical paper, paper produced using bleached pulp, unbleached pulp, or combinations thereof;

iv. comprises a fiber-based product;

v. comprises one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, cartons, bag paper and/or other paperboard products;

vi. comprises cellulose paperboard webs which optionally comprise predominantly cellulose fibers;

vii. comprises from about 0.02% to about 10% cationic GPAM by dry weight of cellulose fibers, optionally in the range of about 0.05 wt % to 5 wt % of the dry paper weight;

viii. comprises an Swedish Pulp and Paper Research Institute (STFI) value improvement of 6% or more, 7% or more, 8% or more, 9% or more, 10% or more, 12.5% or more, 15.0% or more, 17.5% or more, 20.0% or more, 22.5% or more, or 25.0% or more at 5 lbs/ton, 5.0 lbs/ton, 9.0 lbs/ton or 10 lbs/ton testing as compared to a blank sample used for the STFI test of the paper product;

ix. comprises a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at 4.5 lbs/ton, 5.0 lbs/ton, 9.0 lbs/ton or 10 lbs/ton testing as compared to a blank sample used for the burst strength test; or x. a combination of any two or more of (i)-(ix).

8. A method of papermaking, wherein said method comprises adding one or more cationic GPAMs according to claim 1 during the papermaking method in an amount effective to increase the wet and/or dry strength of paper products produced by said method.

9. A method of manufacturing one or more paper products, wherein said method comprises: a. providing a composition comprising predominantly cellulose fibers; b. adding a predetermined quantity of one or more cationic GPAMs according to claim 1; and c. forming the desired paper product.

10. A method of manufacturing one or more paper products, optionally one or more adsorbent paper products, wherein said method comprises: a. providing a composition comprising any of softwood fiber, hardwood fiber, recycle fiber, refined fiber, or a mixture of any of the foregoing in an amount sufficient to form an overall furnish of from approximately 1 to 100% hardwood fiber, softwood fiber, recycle fiber, refined fiber or a mixture of any of the foregoing; (b) adding a predetermined quantity of one or more cationic GPAMs according to claim 1; and (c) forming a paper product by drying on one or more drying means to a desired moisture content level.

11. A method for strengthening paper, comprising contacting pulp fibers with a strengthening resin comprising at least cationic GPAM according to claim 1, and at least partially curing the cationic GPAM in the mixture of pulp fibers and cationic GPAM to produce a paper product of enhanced strength.

12. The method of claim 8, wherein:

i. the cationic GPAM is added at the wet end of a paper-making facility which comprises cellulose fiber suspensions;

ii. the cationic GPAM is added at from about 0.02% by dry weight to about 10% by dry weight of the cellulose fibers, optionally in the range of about 0.05 wt % to 5 wt % of the dry paper weight;

iii. the cationic GPAM is added before, during and/or after the paper is formed;

iv. the paper products comprise an Swedish Pulp and Paper Research Institute (STFI) value improvement of 6% or more, 7% or more, 8% or more, 9% or more, 10% or more, 12.5% or more, 15.0% or more, 17.5% or more, 20.0% or more, 22.5% or more, or 25.0% or more at one or more of 4.5 lbs/ton, 5.0 lbs/ton, 9.0 lbs/ton or 10 lbs/ton testing as compared to a blank sample used for the STFI test of the paper products;

v. the paper products comprise a burst strength value improvement of 6% or more, 7% or more, 8% or more, 9% or more, 10% or more, 12.5% or more, 15.0% or more, 17.5% or more, 20.0% or more, 22.5% or more, 25.0% or more, 27.5% or more, 30.0% or more, 32.5% or more, 35.0% or more, 37.5% or more, or 40% or more at one or more of 4.5 lbs/ton, 5.0 lbs/ton, 9.0 lbs/ton or 10 lbs/ton testing as compared to a blank sample used for the burst strength test;

vi. the paper products comprise one or more of handsheets, board-based products, beverage carriers, toweling, milk and juice cartons, food trays, paper bags, liner board for corrugated containers, packaging board grade, and tissue and towel grade, paper materials, paper towels, diapers, sanitary napkins, training pants, pantiliners, incontinence briefs, tampons, pee pads, litter box liners, coffee filters, air filters, dryer pads, floor cleaning pads, absorbent facial tissue, absorbent bathroom tissue, napkins, wrapping paper, cartons, bag paper and other paperboard products;

vii. the paper products comprise cellulose paperboard webs which optionally comprise predominantly cellulose fibers;

viii. the cationic GPAM improves drainage time of a treated sample by 25.0% or more, 30.0% or more, 35.0% or more, 40.0% or more, 45.0% or more, 50.0% or more, or 55.0% or more as compared to the drainage without the use of the cationic GPAM composition;

ix. the cationic GPAM improves the drainage rate of a treatment sample resulting in increased paper production rate as compared to the drainage without the use of the cationic GPAM composition;

x. the cationic GPAM improves drying energy savings;

xi. the cationic GPAM decreases the total solids content of a treated sample, optionally the solid content of white water from tray or silo post sheet formation, by 15% or more, 17.5% or more, 20.0% or more, 22.5% or more, 25.0% or more, 27.5% or more, 30.0% or more, or 32.5% or more compared to the total amount of solids present in the treated sample without the use of the cationic GPAM composition; or xii. a combination of any two or more of (i)-(xi).

13. The cationic GPAM of claim 1, wherein the cationic GPAM comprises a viscosity of from 30 cps to 35 cps as measured by a Brookfield viscometer equipped with an LV-1 spindle.

14. The cationic GPAM of claim 1, wherein the cationic GPAM comprises a glyoxal:base polymer weight ratio of about 29:71 or 26:74.

15. The cationic GPAM of claim 1, which is suitable for use as a a dry and/or wet strengthening agent without the addition of other polyacrylamide strengthening agents.

16. The cationic GPAM of claim 1, wherein the molecular weight of the base polymer ranges from 200 kDa to 350 kDa.

17. The cationic GPAM of claim 1, which comprises a maximum GPAM concentration of about 4.5% or 5.5% by weight.

18. The cationic GPAM of claim 1, which comprises a critical base polymer concentration (concentration above which the viscosity increases for the reaction mixture resulting from the forward progress of the adduct formation, and below which the viscosity decreases for the reaction mixture resulting from the forward progress of adduct formation) ranging from about 1.8 to 2.1%.

* * * * *